2,830,976

RECOVERY OF COAGULATED POLYMERS AND LOW WATER-SOLUBLE-ASH INSULATING MATERIALS

Thomas J. Kennedy and Raymond A. Tiede, Borger, Tex., assignors to Phillips Petroleum Company, a corporation of Delaware No Drawing. Application October 5, 1954
Serial No. 460,507

7 Claims. (Cl. 260—85.1)

This invention relates to the recovery of polymers which have been coagulated in a latex produced by an emulsion polymerization process. In one of its aspects the invention provides a polymer having a low concentration of water-soluble solutions, i. e., a low water-soluble-ash content by recovering the same from an emulsion-polymerized mass by coagulating and washing the coagulated polymers, upon separation from some or substantially all of the mother liquid, with water containing barium hydroxide. In a more specific aspect of the invention there is provided a method for the production of a copolymer of say, butadiene and styrene, for example as described in United States Patent 2,604,467 to Willie W. Crouch et al., but using in place of the sodium hydroxide, there described to be used, barium hydroxide. In a further aspect of the invention there are provided electric wire and cable insulator materials of good dielectric properties, the said materials comprising polymers recovered as herein described. The finished products, that is the insulated wires or cables are, in another aspect, provided as novel articles of manufacture. Other aspects as well as advantages of the invention are apparent from this disclosure and the appended claims.

In the patent to W. W. Crouch, mentioned above, in the production of copolymers of butadiene and styrene, there is produced by emulsion polymerization a latex containing the copolymers which are then coagulated by the addition of a water-soluble aluminum salt which reacts with the emulsifying agent, there employed, to form an insoluble aluminum hydrocarbon sulfate or sulfonate. Potassium hydroxide or sodium hydroxide or other alkaline reagent is then added to adjust the pH to a value above 9, preferably between 9.4 and 12; the coagulum is then filtered and washed to obtain a polymer substantially free of hydrocarbon sulfonates or sulfates and aluminum. The finished polymer is emulsifier free.

In the normal production of another type of polymer, the polymers are coagulated using a glue-acid coagulation in which the soap is converted to fatty acid which remains in the polymer. Also, this results in a low serum pH which is sometimes undesirable, therefore, the pH is raised by using sodium hydroxide. When this is done, sodium sulfate is formed by the combination of the sodium hydroxide with the sulfuric acid, which is used, and, if any of this water soluble salt remains in the polymer it will be undesirable.

It has now been found that by draining the liquid from the coagulated polymers and then washing or rinsing the polymer slurry, thus obtained, with water the pH of which was raised using barium hydroxide, the washed, dried and ignited polymers will have a very low water-soluble-ash content. Therefore, according to this invention, there are provided a method for the recovery of polymers of low water-soluble-ash content by rinsing coagulated polymers, for example, obtained as described herein, with water containing barium hydroxide; a low water-soluble-ash content polymer; and an insulated electric conductor, or equivalent device, the insulation of which comprises a low water-soluble-ash polymer obtained according to the invention as herein described.

It will be appreciated that a low water-soluble-ash content is an important characteristic of a polymer in several instances, for example, in the insulation against the flow of electricity in which a low-water absorption is a highly advantageous feature. It is known that water-soluble salts carry the current in the presence of even traces of water. Also, and as an important feature of the invention, the use of barium hydroxide permits any pH level to be used without contributing to the formation of materials resulting in an increase of the water-soluble-ash content of the polymer.

Low dielectric constant is an important property of rubber compounds designed for use as insulation in the communication field.

The dielectric constant of a rubber compound is increased considerably by small amounts of absorbed water—hence wire insulation for communications use, usually must have a dielectric constant as stable as possible in the presence of water or moisture. Specifications for rubber insulation for use where di-electric constant is of importance usually include limitations on the permissible increase after prolonged immersion. Frequently the tests involve immersion at an elevated temperature. This serves in a sense as an accelerated water absorption test, although some compounds which may be acceptable after many months of immersion in water at room temperature will fail after a few days in water at a higher temperature. The temperatures most commonly used are room temperature, 50, 70 and 80 degrees centigrade.

An advantage which can be realized employing the invention is in the control of the physical properties, crumb size and crumb tackiness, of the polymer because of the range of pH's made available. Another advantage flowing from said range is the control or minimization of equipment corrosion, as will be understood by those skilled in the art in possession of this disclosure.

The present invention applies in particular to the production of GR–S type rubber-like materials. However, its application to other alternative or similar materials will be within the scope of the routineer in the art in possession of this disclosure.

EXAMPLE I

As an example of the preparation of a polymer according to the prior art the following is given. Butadiene and styrene were polymerized in an emulsion polymerization system employing the following recipe:

| | Parts by weight |
|---|---|
| 1,3-butadiene | 70 |
| Styrene | 30 |
| Mixed tertiary alkyl $C_{12}$–$C_{16}$ mercaptans | 0.28 |
| Cumene hydroperoxide | 0.13 |
| Emulsifier | 5 |
| Water | 180 |
| $Na_3PO_4.12H_2O$ | 0.5 |
| $Na_4P_2O_7.10H_2O$ | 1 |
| Dextrose | 3 |
| $FeCl_3.6H_2O$ | 0.098 |

The polymerization temperature was 41° F. The emulsifier was a mixture of sodium monoalkyltoluene sulfonates having an average molecular weight of 345. The polymerization was short-stopped by addition of 0.2 part di-tertiary butyl hydroquinone at the end of 16.5 hours when the reaction had reached 55 percent conversion.

To 41 volumes of the latex from this polymerization were added 10 volumes of a 2.5 weight percent aqueous solution of aluminum sulfate. The polymer coagulated in the form of a fine crumb. Aqueous sodium hydroxide solution was added to the polymer slurry to adjust the pH to a value of 11.1. A portion of the slurry was stirred for a period of 10 minutes, filtered, and the filter cake washed. The polymer was then dried.

The following are recipes for the preparation of polymers to which the present invention is particularly applicable.

|  | Parts/100 parts Monomer | | |
|---|---|---|---|
|  | A | B | C |
| Ingredients: | | | |
| Butadiene | 72 | 72 | 72 |
| Styrene | 28 | 28 | 28 |
| Water | 200 | 200 | 180 |
| Fatty Acid Soap |  | 4.7 | 4.3 |
| Rosin Acid Soap | 4.5 |  |  |
| Sodium salt of condensed alkyl aryl sulfonic acid | 0.15 | 0.15 |  |
| Persulfate |  |  | 0.25 |
| Diethylenetriamine |  | 0.125 |  |
| Hydroperoxide (Para-Menthane) | 0.1 | 0.18 |  |
| Ferrous Sulfate, 7H$_2$O | 0.2 | .002 |  |
| Potassium Pyrophosphate | 0.25 | .002 |  |
| Potassium Chloride | 0.5 | 0.3 |  |
| Tert-dodecyl mercaptan | 0.2 | 0.2 |  |
| Dodecyl mercaptan |  |  | 0.4 |
| NaOH | 0.1 | 0.1 | 0.2 |
| Temperature °F | 41 | 41 | 117 |

These systems of the tabulated recipes are those used extensively in GR–S copolymer plants. However, they could be used with other monomers such as butadiene-acrylonitrile, butadiene alone, and chloroprene. Polymers made from these monomers in emulsion polymerization are used for wire and cable application.

Latices prepared by the last three formulas or recipes were coagulated. The coagulation solution used was composed of dilute sulfuric acid at 115° to 125° F. and a pH of 1.4 to 1.6. A stream of latex and the coagulation solution were commingled and passed through a mixing pump and then into a coagulation tank to which a stream of five percent aqueous glue solution was continuously added in small amounts sufficient to maintain a clear serum. The slurry was passed from the coagulation tank into a skimmer wherein the coagulated crumb was skimmed off of the surface and the serum was drained continuously from the slurry. The concentrated crumb slurry was passed into a leach and neutralizing tank which contained aqueous barium hydroxide, of a high concentration, which had a pH of 7 to 10.

In the leach tank the residual sulfuric acid reacted with the barium hydroxide and precipitated. The contents of the leaching tank was continuously stirred, which facilitated the separation of the barium sulfate from the crumb. The crumb overflowed from the leaching and neutralizing tank and was passed on to vacuum filters whereon the crumb was water-washed. The cake from the filters was passed through a disintegrator and next through a squeezer wherein residual water was removed by the kneading action of the extruder. The small pellets from the extruder were passed through a drier.

EXAMPLE II

The advantages of the present invention washings with barium hydroxide in place of the sodium hydroxide washings in Example I are shown in the table which follows. The washings with barium hydroxide were affected by adding the barium hydroxide containing water to the polymer slurry to adjust the pH to the indicated value, with stirring, for a period of about 10 minutes following which the slurry was filtered and the filter cake obtained washed. The polymer was then dried and its water-soluble-ash content was then determined.

| Leach pH | Percentage W. S. Ash | |
|---|---|---|
|  | Ba(OH)$_2$ | NaOH |
| 2 to 3 | 0.10 | 0.09 |
| 7 | 0.11 | 0.17 |
| 9 | 0.11 | 0.28 |
| 10 | 0.14 | 0.32 |

From the data in Example II it is clear that while with barium hydroxide desirable higher pH's can be obtained without significant adverse effect on the water-soluble-ash content of the polymer, the use of sodium hydroxide results in considerably increasing, adversely, to the intent of this invention, the said ash content.

EXAMPLE III

Table I

Use of NaOH and Ba(OH)$_2$ in Wire and Cable Polymer Coagulations Effect on Water Soluble Ash and Water Absorption

| I | II | III | IV | V |
|---|---|---|---|---|
| Leach, pH | Percentage W. S. Ash | | Water Absorption, mg./cm.$^2$ | |
|  | NaOH | Ba(OH)$_2$ | NaOH | Ba(OH)$_2$ |
| 3–4 | 0.09 | 0.09 | 1.45 | 1.35 |
| 6 | 0.12 | 0.10 | 1.53 | 1.33 |
| 8 | 0.17 | 0.10 | 1.41 | 1.23 |
| 10 | 0.20 | 0.09 | 1.74 | 1.25 |

The test results summarized in this table were obtained on latex which was coagulated, filtered, washed, rinsed, dried, compounded, cured and tested in the laboratory.

Table I shows that as the pH adjustment to higher pH's is made with NaOH, the water-soluble-ash increases; whereas, with Ba(OH)$_2$ it remains constant. The table also shows that the water absorption increases in the case of the NaOH treated material; whereas, it is actually reduced in the case of the Ba(OH)$_2$ treated material, as pH of the leach is increased.

Table II

Effect of Water Soluble Ash on Water Absorption

| W. S. Ash, Percent | Water Absorption, mg./cm.$^2$ |
|---|---|
| 1.0 | 5.4 |
| 2.0 | 10.4 |

The copolymer tested in this table was made in plant scale equipment. This rubber contained water-soluble-ash removed from other polymers, added to it to increase the water-soluble-ash. This water-soluble-ash was added in the compounding of the copolymers.

Table II shows that as the water-soluble-ash contained in the copolymer increases, the water absorption value also increases.

The quantity of barium hydroxide added can vary widely because of the relatively low solubility of barium hydroxide in water. The solubility of barium hydroxide in water at 15° C. is about 5.6 grams per 100 milliliters of water. This solubility increases to about 95 grams per 100 milliliters of water at 78° C. According to the invention the amount of water and its barium hydroxide content are adjusted to obtain the desired pH which, of course, will depend upon the materials originally present in the slurry. It is preferred to not employ concentrations substantially in excess of the solubility limit at the temperature of operation thus to avoid inclusion in the polymer of barium hydroxide.

From the tabular data given above, it will be noted that at pH's of 7 and above, the water-soluble-ash content is considerably lower for the product repared according to this invention and, therefore, for the product of this invention. Generally, a water-soluble-ash content of 0.15 percent by weight and considerably lower, as indicated, is readily obtained, even at pH's as high as 10, as indicated.

Reasonable variation and modification are possible within the scope of the foregoing disclosure and the appended claims to the invention, the essence of which is that there have been provided a method for the recovery of low water-soluble-ash content polymers, for example GR–S polymer, by washing the coagulated polymer with barium hydroxide containing water, as described herein; a low water-soluble-ash content polymer material, as described herein; and an electrically insulated wire cable or other device as described herein, said polymers treated according to the present invention, which adjusts the pH of the medium wetting the polymers resulting in a water insoluble salt being formed, having a low water-absorption value, as described.

We claim:

1. A method for the treatment of polymers produced by emulsion polymerization and containing a sulfate which includes the step of washing the priorly coagulated polymer slurry with water containing barium hydroxide.

2. In the production of GR–S rubber-like material the step of washing polymer slurry obtained from the emulsion polymerization step, which is employed in the preparation of such a rubber, and containing a sulfate, with water containing barium hydroxide.

3. In the treatment of a dispersion or latex produced by emulsion polymerization of monomers employing at least one of a hydrocarbon sulfate and sulfonate as emulsifying agent in which following polymerization the latex is coagulated by removal of the emulsifying agent, by the addition of a water-soluble aluminum salt thus forming at least one of an insoluble aluminum sulfate and sulfonate and then removing said insoluble, as the case may be, and aluminum, the method which comprises washing a polymer slurry obtained upon coagulation with water containing barium hydroxide.

4. In the treatment of a dispersion or latex produced by emulsion polymerization of butadiene and styrene monomers employing at least one of a hydrocarbon sulfate and sulfonate as emulsifying agent in which following polymerization the latex is coagulated by removal of the emulsifying agent, by the addition of a water-soluble aluminum salt thus forming at least one of an insoluble aluminum sulfate and sulfonate and then removing said insoluble, as the case may be, and aluminum, the method which comprises washing a polymer slurry obtained upon coagulation with water containing barium hydroxide so as to obtain a butadiene-styrene rubber-like copolymer having a water-soluble-ash content below 0.15 percent.

5. In the treatment of a latex produced by emulsion polymerization of monomers employing water and an acid soap in which polymers produced are coagulated using a glue sulfuric acid coagulation agent, converting the soap to fatty acid which remains in the polymers produced, and wherein pH is raised to produce a desirable polymer, the method which comprises washing a polymer slurry obtained upon coagulation with water containing barium hydroxide.

6. A treatment according to claim 5 wherein the monomers are butadiene and styrene.

7. An insulated electric device comprising as insulation therefor a rubber-like polymer obtained by emulsion polymerization in which an aqueous emulsion containing a monomer to be polymerized, an emulsifying agent and water as well as other required polymerization recipe ingredients is polymerized, polymer thus obtained is coagulated and coagulated polymer separated from the mother liquid has been washed with water containing barium hydroxide.

References Cited in the file of this patent

UNITED STATES PATENTS 2,469,827    Johnson _____ May 10, 1949